(No Model.) 2 Sheets—Sheet 1.

H. P. BENNETT.
EXCAVATOR.

No. 501,400. Patented July 11, 1893.

Witnesses,
Inventor,
Henry P. Bennett
By Dewey & Co.
attys (No Model.) 2 Sheets—Sheet 2.

H. P. BENNETT.
EXCAVATOR.

No. 501,400. Patented July 11, 1893.

Witnesses:
Inventor,
Henry P. Bennett.
By Dewey & Co.
attys

UNITED STATES PATENT OFFICE.

HENRY P. BENNETT, OF PHŒNIX, ARIZONA TERRITORY.

EXCAVATOR.

SPECIFICATION forming part of Letters Patent No. 501,400, dated July 11, 1893.

Application filed October 24, 1892. Serial No. 449,845. (No model.)

*To all whom it may concern:*

Be it known that I, HENRY PATRICK BENNETT, a citizen of the United States, residing at Phœnix, Maricopa county, Territory of Arizona, have invented an Improvement in Excavators; and I hereby declare the following to be a full, clear, and exact description of the same.

My invention relates to that class of excavating or ditching machines, in which a rotating wheel provided with a series of elevating buckets, receives the material from a plow below and delivers it above to a vibrating discharge shovel which throws it to one side.

My present invention is an improvement upon that excavating or ditching machine for which I made application for a patent January 27, 1892, Serial No. 419,412.

My invention consists in a novel controlling apron between the vibrating shovel and the discharge hopper to which the buckets successively deliver the material.

It also consists in making the shovel perforated, and in the novel construction and arrangement of the means for vibrating the shovel all of which I shall hereinafter fully describe and specifically point out in the claims.

The objects of these improvements will appear in the course of the description.

Figure 1:
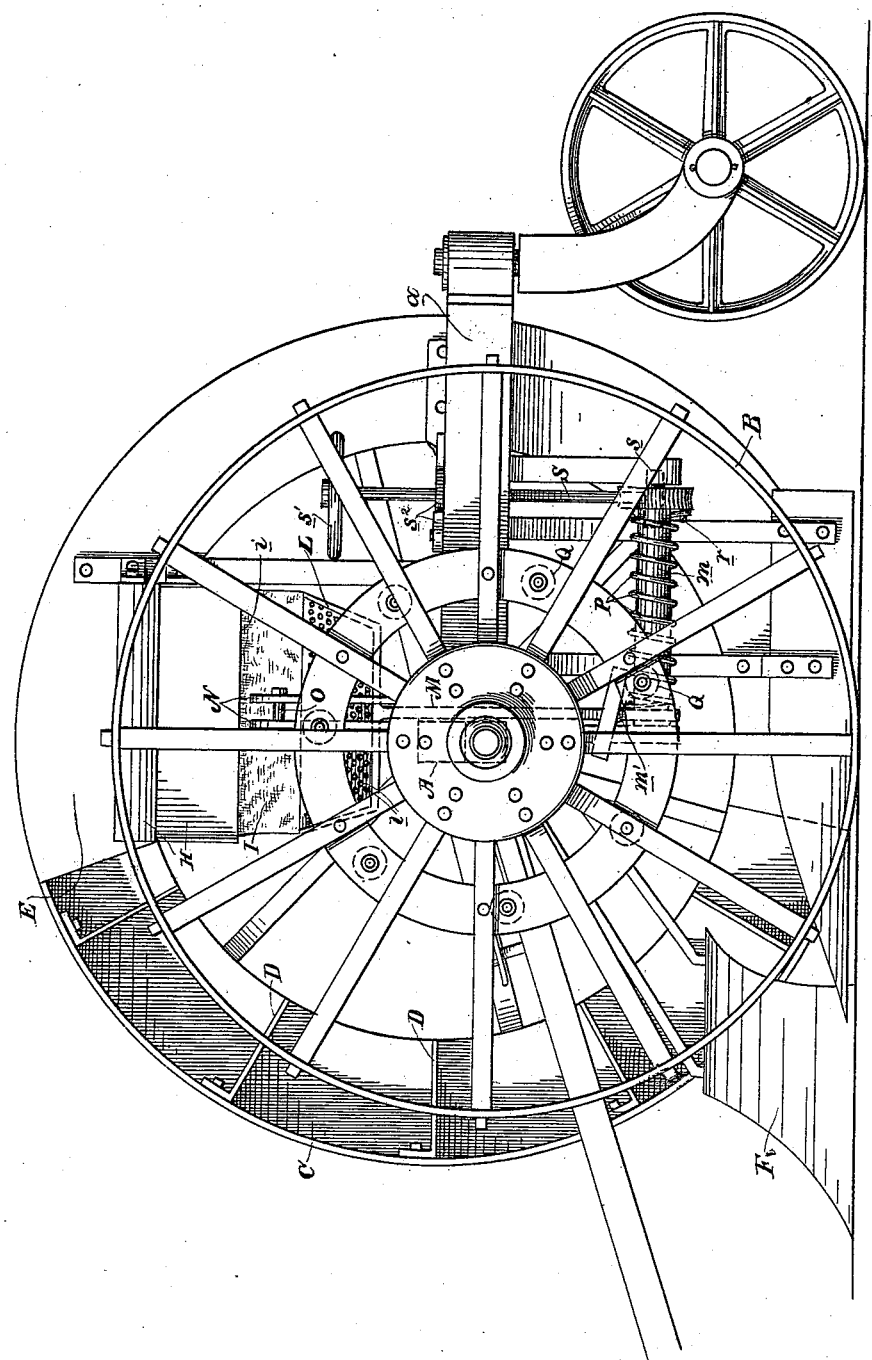
Figure 2:
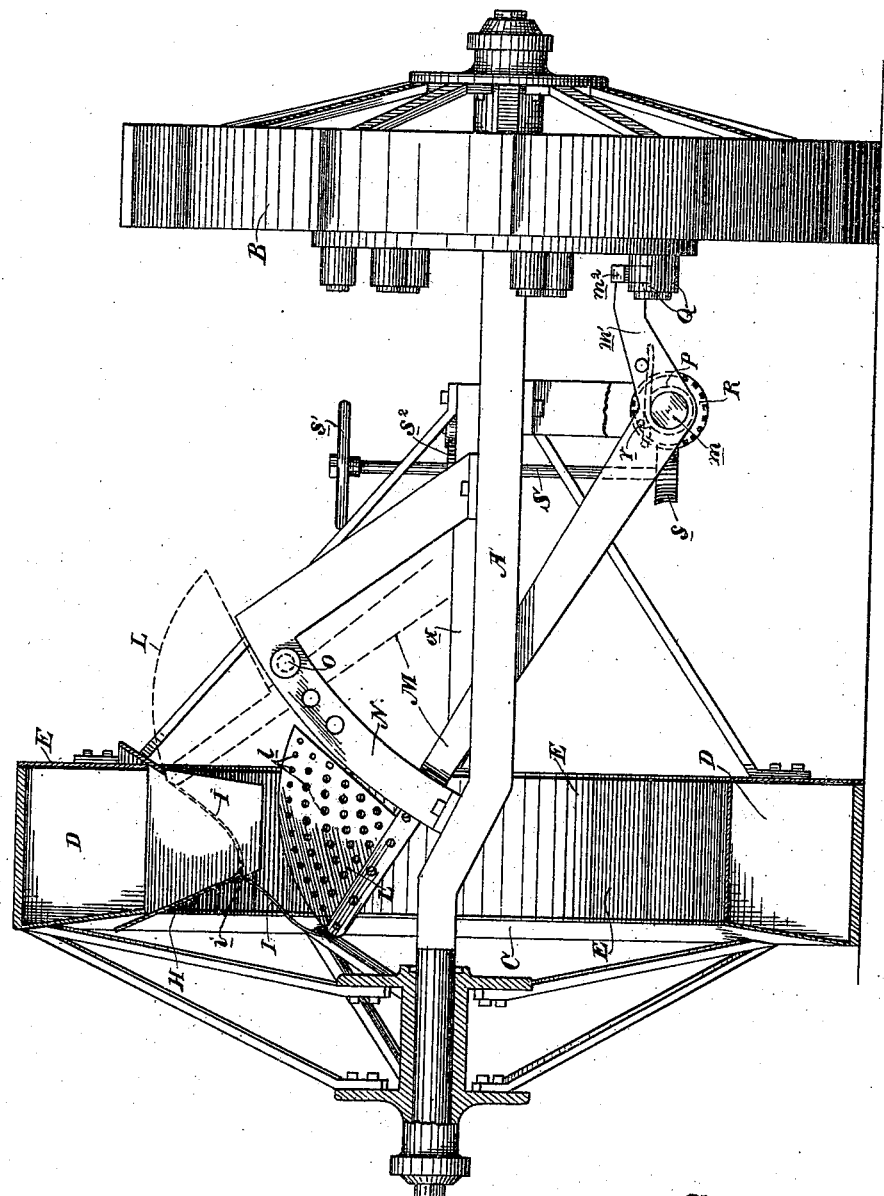

Referring to the accompanying drawings for a more complete explanation of my invention, Figure 1 is a side elevation. Fig. 2 is a front view, the large wheel C and its connections being in section.

A is an axle to which is to be attached a suitable pole, and upon which is carried a suitable frame $a$. On one end of the axle is a small wheel B and on the other end is a large wheel C which has on the inner surface of its rim the series of buckets D which in their revolution pass through a fixed casing E suitably supported from the axle.

F is the excavating plow located in position to turn the dirt into the buckets D as they successively come around into position, by the rotation of the wheel C.

At the upper portion of the confining casing E is an opening under which, in position to receive the dirt from the rotating buckets, is a receiving hopper H which consists of inclined side directing plates, having no bottom between them.

L is the discharge shovel. This is carried upon the upper end of the handle M, which is pivoted upon a fixed shaft $m$, and has a short arm $m'$ extending over, and adapted to be acted upon by a series of contacts Q carried by the small wheel B. A spring P acts upon the handle to throw the shovel, said handle operating within a slotted guide N; its stroke is limited by an adjustable buffer pin O adapted to be located in different holes in the guide, whereby the length of the stroke of shovel is determined.

The general operation of the machine as far as described is as follows: In traveling over the ground the plow turns the dirt into the buckets as they successively pass. The dirt is carried upwardly through the casing E, and when it reaches the top is discharged into the receiving hopper H through which it falls into the shovel. When the shovel receives its load, it is caused to be thrown inwardly; and its handle coming in contact with the buffer pin O, the contents of the shovel are violently thrown out from it to the inner side of the machine. This movement of the shovel is due to the action of the spring P, when the short arm of the handle is relieved by the contacts Q. The rollers then return the shovel to position under the hopper, to receive a fresh load.

In my previous machine I employed a swinging gate upon the bottom of the hopper, said gate being automatically operated by means of suitable tripping connections from the shovel. In my present machine this gate and its connections are dispensed with and instead thereof, I have the controlling apron I, which I shall now describe. It consists of a strong canvas or other suitable flexible material. Its upper edge is secured to the lower edge of the back plate of the hopper as shown at $i$, and its lower edge is secured to the upper or top edge of the back of the shovel. It will now be seen that by reason of the position of the pivotal center of movement of the shovel, the latter will vibrate through an arc which at its back limit will cause the apron to fall away from the bottom of the hopper and expose the top of the shovel, said apron in this position extending between the top of the back of the shovel and the bottom of the back of the hopper thereby serving as a guard or protection to prevent the falling dirt from discharging or spilling backwardly over the top of the shovel. At the forward limit of movement of the shovel, the apron will be carried upwardly and forwardly across the bottom of the hopper, and in this position will serve as a bottom for said hopper, while the shovel is discharging its load. The apron opens up the bottom of the hopper as the shovel returns for a fresh load. Thus the apron has a double function, namely that of serving as a back protection and guard for the shovel while receiving the dirt, and as a bottom for the hopper while the shovel is discharging the dirt. This flexible apron obviates the use of a metallic gate for the bottom of the hopper, and avoids the clatter and jar of such gate, and the wear on the shovel in operating it.

The inclosing walls of the shovel are perforated as shown by $l$. The object in thus perforating the shovel is, to prevent a vacuum being formed behind the material as it is discharged, and to facilitate the throw of the material from the shovel.

The perforated shovel delivers its material freely and prevents that suction and consequent scattering and shortness of throw of the material, found in practice to follow the use of a solid or imperforate shovel.

The short arm $m'$ of the shovel handle is provided with an inclined cross cam $m^2$ which lies in the path of the contacts Q on the small wheel B. These contacts may be of any suitable character, and they are here shown as anti friction rollers mounted upon pins.

The spring P is adapted to have its tension regulated, to effect and control the throw of the shovel, by means of a worm gear R mounted upon the end of the shaft $m$, and having a pin $r$ bearing against the end of the spring. This worm gear is operated by a worm pinion $s$ on the lower end of a shaft S, having a handle $s'$ above, and controlled by a pawl and ratchet $s^2$ as shown.

Having thus described my invention, what I claim as new, and desire to secure by Letters Patent, is—

1. In an excavating machine, the combination of an elevator wheel, a fixed hopper into which said wheel discharges the dirt, a vibrating shovel adapted to receive the dirt from the hopper, and to throw it to one side, and a flexible apron extending between and connected with the backs of the hopper and shovel, whereby said apron serves as a back guard as the shovel is receiving the dirt, and a bottom for the hopper as the shovel is discharging the dirt, substantially as herein described.

2. In an excavating machine, the combination of a frame, an excavating plow, a wheel upon which the frame is mounted, said wheel having a series of elevating buckets successively receiving the dirt from the plow, a fixed hopper above into which the buckets successively discharge the dirt, a vibrating shovel adapted to receive the dirt from the hopper and to throw it to one side, and a flexible apron extending between and connected to the backs of the hopper and shovel whereby said apron serves as a back guard for the shovel when receiving the dirt, and as a bottom for the hopper when the shovel is discharging its load, substantially as herein described.

3. In an excavating machine, a vibrating shovel adapted to receive the dirt and to throw it to one side, said shovel having perforated walls, substantially as herein described.

4. In an excavating machine, the axle, the elevator wheel on one end of the axle, and the wheel B on the other end, in combination with the shovel, having the pivoted handle with the short arm, a spring for throwing said handle forward, the contacts on the wheel B, and the cam on the short arm of the handle for returning said handle, substantially as herein described.

5. In an excavating machine, the axle, the elevator wheel on one end and the wheel B on the other end, in combination with the shovel, the handle of said shovel having the short arm with the cam, the contacts on the wheel B, the shaft on which the handle is pivoted, the spring encircling the shaft and bearing on the handle, and the means for regulating the tension of the spring consisting of the worm, bearing on the spring, the shaft, and pinion on said shaft, substantially as herein described.

In witness whereof I have hereunto set my hand.

H. P. BENNETT.

Witnesses:
 W. M. WARD,
 BERT SPENCER.